United States Patent [19]

Ludvigsen

[11] Patent Number: 4,519,496

[45] Date of Patent: May 28, 1985

[54] CONVEYOR SCREW WITH WEAR-RESISTANT MEMBERS ATTACHED TO ITS OPERATIVE SURFACE

[75] Inventor: Erik Ludvigsen, Søborg, Denmark

[73] Assignee: Alfa-Laval Separation A/S, Søborg, Denmark

[21] Appl. No.: 444,177

[22] Filed: Nov. 24, 1982

[30] Foreign Application Priority Data

Dec. 9, 1981 [DK] Denmark ............................ 5456/81

[51] Int. Cl.[3] ............................................ B65G 33/26

[52] U.S. Cl. ...................................... 198/676; 198/677

[58] Field of Search ........................ 198/676, 677, 664; 494/54; 403/355, 405, 406

[56] References Cited

U.S. PATENT DOCUMENTS

| | | | |
|---|---|---|---|
| 2,610,739 | 9/1952 | Bitzer | 198/676 |
| 3,762,537 | 10/1973 | Lutz | 198/676 |
| 3,764,062 | 10/1973 | Brautigam | 494/54 |
| 3,977,515 | 8/1976 | Lewoczko | 198/677 |
| 4,328,925 | 5/1982 | Shapiro | 494/54 |
| 4,429,770 | 2/1984 | Weisbrod | 403/355 |

FOREIGN PATENT DOCUMENTS

| | | | |
|---|---|---|---|
| 2556671 | 7/1976 | Fed. Rep. of Germany . | |
| 2729057 | 1/1979 | Fed. Rep. of Germany | 198/677 |
| 2924047 | 1/1981 | Fed. Rep. of Germany | 198/676 |
| 149912 | 11/1981 | Japan | 198/676 |

OTHER PUBLICATIONS

PCT Pamphlet WO 81/02853.

*Primary Examiner*—Joseph E. Valenza
*Assistant Examiner*—Daniel R. Alexander
*Attorney, Agent, or Firm*—Bernard, Rothwell & Brown

[57] ABSTRACT

A conveyor screw includes a substantially continuous row of wear-resistant elements mounted on the wearing surface thereof. Opposed complementary semi-circular recesses are formed in adjacent wear-resistant elements providing a combined circular recess. A retaining member is received in each such recess and is secured to the conveyor screw with its axis positioned in the radial dividing line between adjacent wear-resistant elements. The gap between the retaining member and the wear-resistant elements is filled with a resilient padding material. In a modified form of the invention each wear-resistant element includes a backing plate of ductile material with each wear-resistant element being off-set relative to its corresponding backing plate. Adjacent faces of the backing plates, in lieu of being straight, are formed at an angle of approximately 175° so as to provide a small gap permitting use of uniform components along a conveyor screw having a changing diameter.

7 Claims, 11 Drawing Figures

CONVEYOR SCREW WITH WEAR-RESISTANT MEMBERS ATTACHED TO ITS OPERATIVE SURFACE

BACKGROUND OF THE INVENTION

This invention relates to a conveyor screw, especially but not exclusively for use in a decanter centrifuge, comprising a substantially continuous row of generally quadrilateral wear-resistant elements mounted on the operative surface of the conveyor screw along the outer contour thereof with their outer longitudinal edge faces following broadly the contour of the screw surface and providing beyond that contour and with their end faces extending generally in radial directions and in abutting relationship, said wear-resistant elements being retained on the conveyor screw by means of element retaining members secured to the conveyor screw between consecutive elements.

The wear-resistant elements, which prevent erosion of the screw when the goods being transported are highly abrasive, are generally made of carbide, such as tungsten carbide, or ceramic material, e.g. aluminium oxide, i.e. materials whose thermal coefficient of expansion differs considerably from the coefficient of expansion of the screw material, normally steel. Consequently, a direct securing of the elements to the screw by brazing or glueing has proven to be unsuited, and instead one has looked for suitable methods of mechanically securing the wear-resistant elements to the surface of the screw.

The published German patent application No. 25 56 671 (which claims priority from a U.S. patent application Ser. No. 533,198 filed Dec. 16, 1974 now U.S. Pat. No. 3,977,515) discloses a conveyor screw of the kind referred to above in which complementary dovetail formations are provided on the underside of each wear-resistant element, i.e. the side facing the screw surface, and on element retaining blocks welded to the screw surface, respectively. In plan view the dovetail formations on the wear-resistant elements converge outwardly from the screw axis, while on the retaining blocks they diverge outwardly. The wear-resistant elements are sequentially inserted in the wedge-shaped spaces defined between consecutive retaining blocks from the inner end of each space, and they are then driven outwardly until they are held securely by the engagement between the opposed dovetail formations. The wedge action creates inherent tensile and bending stresses in the zones of the wear-resistant elements adjacent the dovetail formations. If, during operation, the conveyor screw rotates at high speed, such as in a centrifuge, the wear-resistant elements are subjected to centrifugal forces which enhance the wedge action whereby said stresses in the material of the elements increase further. The materials mentioned above, from which the wear-resistant elements are often made, are, however, rather brittle and, therefore, uncapable of sustaining large tensile and/or bending stresses.

SUMMARY OF THE INVENTION

It is an object of the present invention to provide novel means for mounting the wear-resistant elements in such a way that undesirable tensile and/or bending stresses in the elements are avoided.

According to the invention there is provided a conveyor screw of the kind referred to characterized in that on each element retaining member there is provided an axially symmetric guide surface, the diameter of which decreases towards the surface of the screw, that the symmetry axis of the guide surface intersects the screw surface in a point of the radial dividing line between the associated wear-resistant elements, and that a recess defining a guide surface, which is complementary to one half of the guide surface on the retaining member, is provided in each end face of the wear-resistant elements.

In a conveyor screw according to the invention the location of each wear-resistant element relative to the screw surface, both parallel to the surface and perpendicular thereto, is determined solely by the geometric configuration of the element retaining members and the complementary recesses in the end faces of the element. In practice, the retaining members and the recesses will be manufactured with such tolerances that after assembly there remains a narrow clearance between their opposed guide surfaces, and that clearance will be filled up by a suitable padding material, e.g. an epoxy resin, which after being hardened creates a certain glue bond between the components while at the same time it is sufficiently resilient to ensure that the forces, which, during operation, occur between each element and the associated retaining members, are transmitted through a suitably large area of the guide surfaces. It will be appreciated, firstly that no inherent stresses are present in the wear-resistant elements due to their mounting on the screw, and secondly, that the stresses in the edge zones of the wear-resistant elements resulting from the forces occurring during operation, in particular centrifugal forces, will be compression stresses only. It is well-known that carbides, oxides, and other wear-resistant materials generally exhibit large ultimate compressive strength.

According to a feature of the invention each element retaining member may be riveted to the screw and have a conical head with outwardly increasing diameter which cooperates with a complementary, conical recess in each end face of the associated wear-resistant elements.

In an alternative embodiment the element retaining members comprise threaded studs which are welded to the screw, and associated nuts with conical guide surfaces cooperating with complementary conical guide surfaces recessed in the end faces of the wear-resistant elements.

The cross-section of the wear-resistant elements parallel to the periphery of the screw may be stepped in such a way that the portion of the cross-section remote from the screw is retracted past the recess in one end face of the portion nearest to the screw and protrudes correspondingly beyond the other end face of the latter portion. The heads or nuts of the element retaining members will then be covered by the offset outer portions of the wear-resistant elements and, thus, protected from the abrasive effect of the goods being transported.

This embodiment may be realized by means of wear-resistant elements each of which is composed of a backing plate of ductile material, which is held against the screw by means of two associated element retaining members, and a tile of wear-resistant material which is secured to the forward face of the backing plate and is offset, in the peripheral direction of the screw, relative to the backing plate in such a way that said stepped cross-section of the element results. The wear-resistant material proper is then entirely relieved of internal stresses resulting from a possible contact between the elements and the associated retaining members, since these members engage with the backing plates only.

In a further development the parts of each end face of each backing plate, which are located outwardly and inwardly, respectively, of the recess for receiving an element retaining member, include an obtuse angle of nearly 180°, and the end faces of the wear-resistant tiles are formed as circular arcs with substantially equal radii and being convex at that end of a tile which protrudes beyond the backing plate, and concave at the other end of the tile. This embodiment is particularly suited for a conveyor screw in a decanter centrifuge which screw is composed of a cylindrical section and a conical section which latter conveys the solids precipitated in the decanter towards an outlet opening at the end of the conical screw section. With this configuration of the wear-resistant elements proper, which is known per se from German patent specification No. 27 29 057, the operative surface of the entire conical section of the conveyor screw can be covered by identical wear-resistant elements without giving rise to undesired gaps between consecutive wear-resistant tiles. It is evident that such gaps will occur between the backing plates, but at these locations the gaps are harmless because they are covered, towards the goods being transported, by the tightly abutting wear-resistant tiles.

BRIEF DESCRIPTION OF THE DRAWINGS

The invention will now be described in more detail with reference to the accompanying, somewhat schematical drawings, in which.

DETAILED DESCRIPTION

Figure 1:
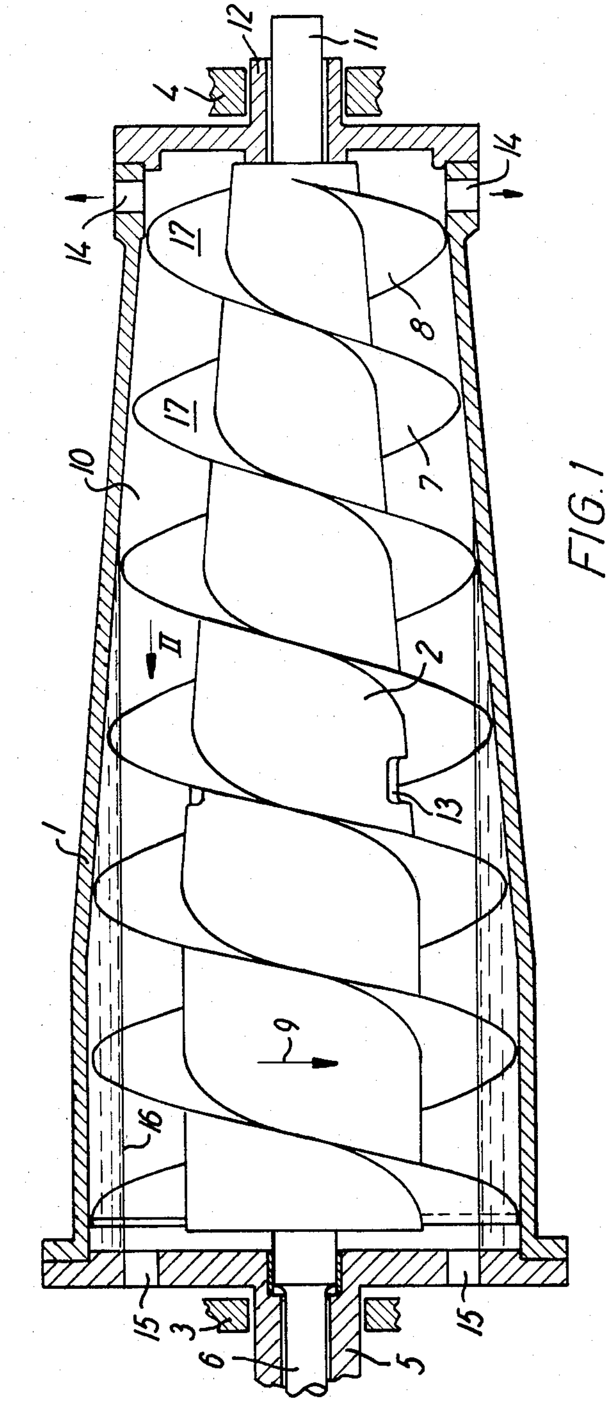
FIG. 1 is a longitudinal section through a decanter centrifuge with a conveyor screw according to the invention, the wear-resistant elements along the outer contour of the screw being omitted for the sake of clarity.

The centrifuge illustrated in FIG. 1 comprises a drum 1 and a conical inner rotor 2, both of which are conical through part of their length. At its ends drum 1 is supported in two bearings 3 and 4. The protruding stub shafts 5 and 6 shown at the left of FIG. 1 are coupled to a drive mechanism (not shown) which causes the drum and rotor to rotate in the same direction with slightly different rpm.

To rotor 2 there is secured a double-start conveyor screw, the helixes of which are designated by 7 and 8.

The aforesaid difference between the rpm of the drum and of the rotor corresponds to a relative rotation of rotor 2 in the direction of arrow 9 whereby screw 7, 8 conveys solids precipitated in the separation space 10 of the centrifuge, towards the right.

The raw material to be separated into solids and a liquid phase is introduced through a stationary pipe 11, which extends into the hollow rotor 2 through the hollow bearing stud 12 of drum 1. From the interior of the rotor the raw material flows into the separation space 10 through apertures 13 in the rotor wall. The precipitated solids are discharged from drum 1 through apertures 14 at the right-hand end of FIG. 1 while the liquid phase flows out through overflow apertures 15 in the left end wall of the drum. Apertures 15 determine the liquid level 16 within the drum.

Figure 3:
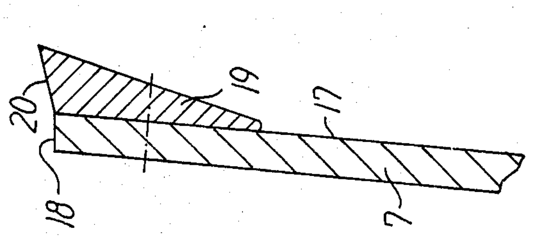
FIG. 3 is a section along line III—III of FIG. 2.
Figure 2:
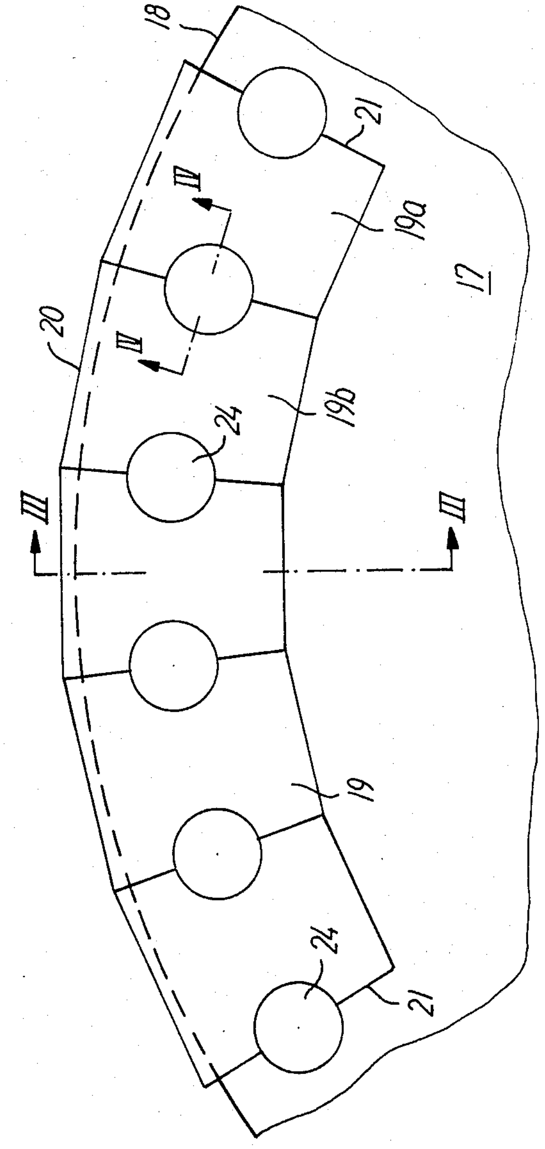
FIG. 2 is a fractional view of the conveyor screw seen in the direction of arrow II in FIG. 1 and on a larger scale.

On the operative surface 17 of each screw helix 7 or 8, i.e. that surface which functions to convey the solids towards apertures 14, there are secured an essentially continuous row of wear-resistant elements along the outer contour 18 of surface 17, see FIGS. 2 and 3. In this embodiment each element is a sintered tile 19 of e.g. carbide or ceramic material. In plan view each tile 19 is shaped as a trapezium with a rectilinear outer edge face 20 protruding slightly beyond the contour 18 of the screw, and two inwardly converging end faces 21, which after mounting of the tiles abut against the end faces of the neighbouring tiles substantially without clearance.

Figure 4:
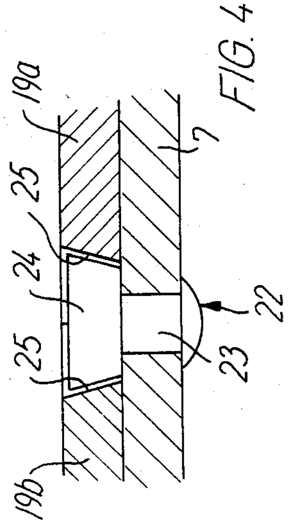
FIG. 4 is a fractional section, on a still larger scale, along line IV—IV of FIG. 2.

Tiles 19 may be mounted on the conveyor screw by means of the element retaining members 22 shown in FIG. 4, each of which comprises a shaft 23, riveted in the helix of the conveyor screw, and a conical head 24 with outwardly increasing diameter. The vertex angle of the lateral or peripheral surface of the head can be about 30°. Each retaining member 22 serves for the mounting of two successive tiles, designated by 19*a* and 19*b* in FIG. 4, in that the retaining member is secured to the screw in the dividing surface between the tiles, each of which has in its end faces 21 recesses 25 each of which is complementary to one half of the conical rivet head 24.

The dimensions of tiles 19, including the recesses 25, and retaining members 22 are such that a narrow gap is formed between each rivet head 24 and the adjoining recesses 25. This gap, the width of which has been shown exaggerated in FIG. 4 for the sake of clarity, can in practice be about 0.1 mm or slightly more. During assembly the gaps are filled up, as already mentioned above, by an epoxy resin or a similar material, which after being hardened forms a bond between the rivet heads and the tiles thereby supplementing the geometrically determined location of each tile by means of the two associated retaining members 22. If the surface of tiles 19 oriented towards the conveyor screw is flat, there occurs also at this place a narrow interstice, which in a corresponding manner is filled up by said bonding and padding agent.

Figure 5:
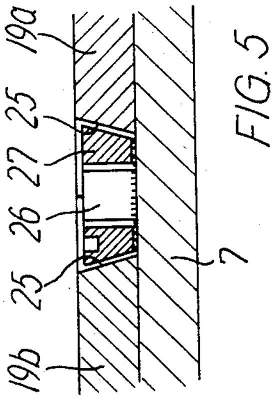
FIG. 5 is a corresponding fractional section showing a modified embodiment of an element retaining member.

FIG. 5 illustrates an alternative way of mounting two consecutive tiles 19*a* and 19*b* on the screw, in this case by means of a threaded stud 26 welded to the screw helix 7, and a nut 27 which is screwed onto the stud, and which is externally conical corresponding to the rivet head 24 shown in FIG. 4.

Although the tiles 19 have been shown as being in direct abutment along their end faces 21, there may also at this place be a narrow gap, which during assembly is filled up by the previously mentioned bonding and padding agent.

FIGS. 6–9 illustrate a modified embodiment of a wear-resistant element which in this case consists of a backing plate 28 of stainless steel or other ductile material, and a tile 29 of wear-resistant material secured to the backing plate.

Like the wear-resistant elements 19 described above, backing plate 28 is generally shaped as a trapezium with a conical recess 30 in each end face for receiving a complementary conical retaining member (not shown) by means of which element 28, 29 is mounted on the conveyor screw (not shown). The two parts 31*a* and 31*b* of each end face, which are located radially outwardly and inwardly, respectively, of each recess 30, include, however, an obtuse angle which in the embodiment shown is approximately 175° and whose vertex coincides with the centre of recess 30. The wear-resistant tile 29 is secured to the surface 32 of backing plate 28 which is oriented away from the conveyor screw, by means of two pins 33, which are pressed into the backing plate and are received with a small clearance in two holes in tile 29. When elements 28 and 29 are joined, these clearances are filled up by a suitable bonding and padding agent which is also applied to surface 32 and to the opposed surface of tile 29.

Figure 6:
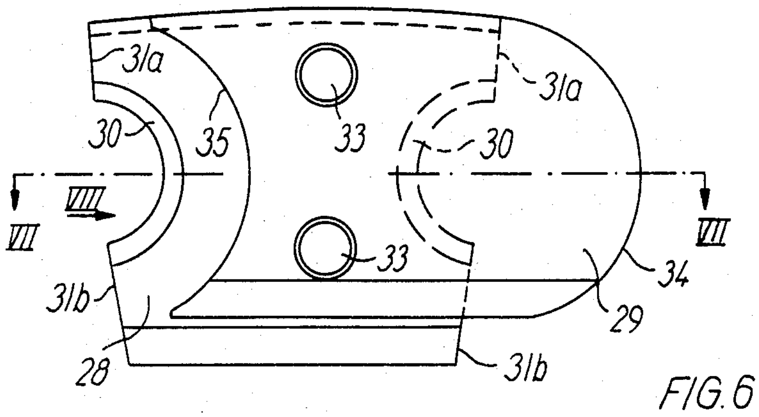
FIG. 6 is an elevation of an alternative embodiment of a wear-resistant element for mounting on the conveyor screw.
Figure 7:
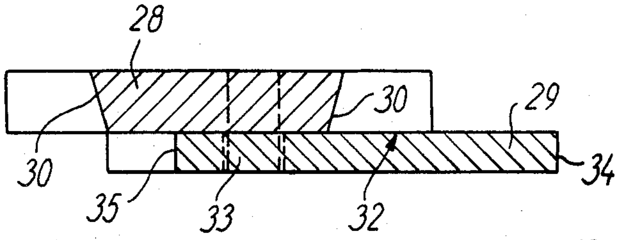
FIG. 7 is a section along line VII—VII of FIG. 6.

The end face 34 of tile 29 at the right-hand end of FIGS. 6 and 7 is formed as a convex arc of a circle with its centre coinciding with the centre of the subjacent recess 30, and the left-hand end face 35 of the tile follows a corresponding concave arc of a circle having the same radius and its centre coinciding with the centre of the associated recess 30. Due to this shape of the tiles it is possible, by means of mutually identical elements 28, 29, to juxtapose a substantially continuous row of wear-resistant elements along the contour of a screw, the diameter of which varies within a broad range. This has been illustrated in FIGS. 9*a–c* which show the mutual positions of two consecutive elements 28, 29 at different screw diameters.

Figure 9A:
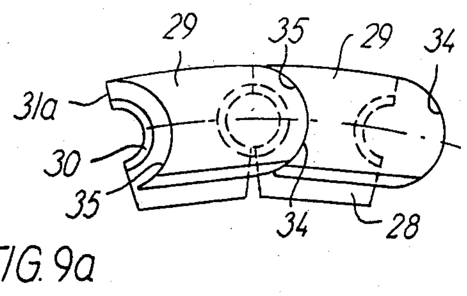
Figure 8:
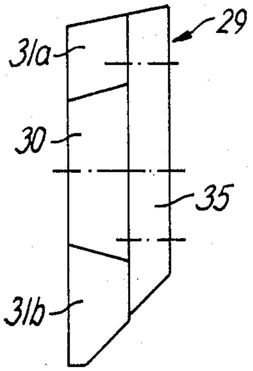
FIG. 8 is an end view of the element seen in the direction of arrow VIII in FIG. 6, and FIGS. 9*a, b,* and *c* are three views which illustrate, on a smaller scale, how elements according to FIGS. 6–8 can be adapted to different outer diameters of the conveyor screw.
Figure 9B:
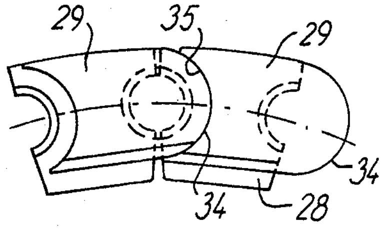
Figure 9C:
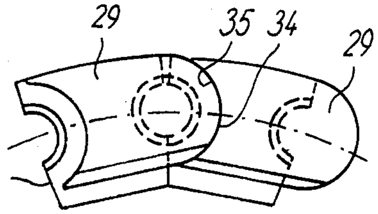

FIG. 9*a* corresponds to the upper limit of said diameter range, where the two backing plates abut one another along the outer parts 31*a* of their end faces while wedge-shaped gaps are formed between the inner face parts 31*b*. FIG. 9*c* shows the positions of the elements at the minimum diameter where the face parts 31*b* abut on one another, and FIG. 9*b* corresponds to an intermediate value of the diameter where gaps occur between the backing plates both outwardly and inwardly of the recesses. In all configurations the arcuate end faces 34 and 35 of the wear-resistant tiles 29 are, however, in abutting relationship so that on its operative side the screw has a practically continuous wear-resistant surface oriented towards the goods being transported.

While in the embodiments described above the retaining members and the wear-resistant elements have been shown with conical guide surfaces, the desired effect could be obtained with differently shaped surfaces of revolution. For instance, the rivet head shown in FIG. 4 could be replaced by a head consisting of an outermost (as viewed from the screw surface) cylindrical portion and an innermost cylindrical portion with a smaller diameter than the outermost portion. The nut shown in FIG. 5 could be modified correspondingly. It will also be appreciated that the invention is applicable on any conveyor screw for transporting abrasive materials, including screws rotating in stationary pipes or troughs.

I claim:

1. A conveyor screw comprising:

a substantially continuous row of generally quadrilateral wear-resistant elements mounted on the operative surface of the conveyor screw along the outer contour thereof with their outer longitudinal edge faces following broadly said contour and protruding beyond the contour, and with their end faces extending generally in radial directions and in abutting relationship;

a plurality of element retaining members secured to the conveyor screw for retaining said wear-resistant elements on the operative screw surface;

each element retaining member having thereon an axially symmetric guide surface, the diameter of which decreases towards the operative surface of the screw, the symmetry axis of each guide surface intersecting said screw surface in a point of the radial dividing line between two juxtaposed wear-resistant elements;

each wear-resistant element having in each of its end faces a recess defining a guide surface which is complementary to one half of the guide surface on an element retaining member;

the recesses on said end faces of said juxtaposed wear-resistant elements forming a combined recess having a size exceeding that of the element retaining member received in said combined recess thereby providing a narrow gap between said element retaining member and said wear-resistant elements; and said gap being filled with a resilient padding agent forming a bond between said element retaining member and said wear-resistant elements.

2. A conveyor screw as claimed in claim 1, wherein said guide surfaces on the element retaining members and in the end faces of the wear-resistant elements are conical.

3. A conveyor screw as claimed in claim 2, wherein the element retaining members are riveted to the screw and are formed with conical heads the lateral surfaces of which constitute the guide surfaces of said members.

4. A conveyor screw as claimed in claim 2, wherein the element retaining members comprise threaded studs which are welded to the screw, and associated nuts with conical lateral surfaces which constitute the guide surfaces of said members.

5. A conveyor screw as claimed in claim 2, wherein each wear-resistant element comprises a rear portion adjacent the operative surface of the screw and a front portion offset relative to the rear portion in the peripheral direction of the screw, said recesses being formed solely in the end faces of the rear portion, and wherein the front portion is offset to such an extent that one of its end faces is retracted past the recess in the subjacent end face of the rear portion while its opposite end face protrudes correspondingly beyond the other end face of the rear portion.

6. A conveyor screw as claimed in claim 5, wherein said rear portion is a backing plate made of a ductile material, and said front portion is a tile of wear-resistant material which is secured to the forward face of the backing plate.

7. A conveyor screw as claimed in claim 6, wherein the parts of each end face of each backing plate, which are located outwardly and inwardly, respectively, of the recess for receiving an element retaining member, include an obtuse angle of nearly 180°, and the end faces of the wear-resistant tiles are formed as circular arcs of substantially equal radii and being convex at that end of each tile which protrudes beyond the backing plate, and concave at the other end of the tile.

* * * * *